United States Patent Office — 3,756,962, Patented Sept. 4, 1973

3,756,962
GRAPHITE-COPPER(II)-CHLORIDE INTERCALATION CARRIER-CATALYST COMBINATION
Hans Brinkel, Nienburg, Helmut Derleth, Sarstedt, and Hermann Fischer, Evern, Germany, assignors to Kali-Chemie Aktiengesellschaft, Hannover, Germany
No Drawing. Filed Sept. 15, 1971, Ser. No. 180,863
Claims priority, application Germany, Sept. 17, 1970,
P 20 45 949.8
Int. Cl. B01j *11/78*
U.S. Cl. 252—441        12 Claims

ABSTRACT OF THE DISCLOSURE

A catalyst-carrier combination comprises the calcined product of a graphite-copper(II)-chloride intercalation compound and a carrier therefor. The carrier comprises aluminumoxyhydrate of a specific surface of 50–300 m.$^2$/g. The carrier may also include asbestos powder. The graphite-copper(II)-chloride intercalation compound is present in an amount from 25–66% by weight and the carrier is present in an amount of 75–34% by weight. If the carrier includes asbestos powder, the amount of asbestos is up to 15% by weight relative to the non-calcined total mixture.

BACKGROUND OF THE INVENTION

The present invention relates to a graphite-copper(II)-chloride intercalation catalyst-carrier combination.

From French Pat. 1,533,567 it is known that graphite-copper(II)-chloride intercalation compounds may be used as catalysts in lieu of Deacon catalysts in processes for the oxychlorination of hydrocarbons and chlorinated hydrocarbons by reaction of these compounds with hydrogen chloride in the presence of oxygen. The catalysts disclosed in this patent are obtained by mixing the graphite intercalation compound with an inert carrier material, for instance kieselguhr, silica gel or γ-aluminum oxide in dry condition at a ratio between 2:1 and 1:2, and forming tablets out of the mixture by a compression process. The ratio of copper(II)-chloride to graphite in the graphite intercalation compound is at most 69.6:30.4, and preferably is between 25:75 and 60:40. These catalysts are highly active, that is good yields of the desired compounds are obtainable at comparatively low temperatures (240–260° C.). The amount of by-products in the final reaction product is comparatively low.

The problem that has thus far defied solution is that this catalyst material, which has a high heat conductivity, has a tendency to disintegrate to a powder under the reaction. For an economical process it is, however, important that the catalyst material be present in piece or lump form, in order to withstand the particular reaction conditions for an extended period of time.

It is therefore the object of the present invention to provide for a graphite-copper(II)-chloride intercalation catalyst-carrier combination which avoids these shortcomings of the catalysts of the prior art.

SUMMARY OF THE INVENTION

The catalyst-carrier combination of the invention comprises the calcined product of a graphite-copper(II)-chloride intercalation compound and a carrier which consists of aluminumoxyhydrate of a specific surface of 50–300 m.$^2$/g. and may also include asbestos powder. The intercalation compound is present in an amount of 25–66% by weight, while the carrier is present in an amount of 75–34% by weight. If asbestos is included in the carrier, it may comprise up to 15% by weight relative to the non-calcined total mixture.

The invention also embraces a process of making the indicated catalyst-carrier combination by intimately mixing and plasticizing the intercalation compound and carrier, then shaping the plasticized material, drying the shaped bodies and calcining them at temperatures between 250 and 750° C.

DESCRIPTION OF THE INVENTION AND OF SPECIFIC EMBODIMENTS

The preferred graphite-copper(II)-chloride intercalation compounds in connection with the invention are intercalation compounds which contain from 10 to 69.6% by weight, and preferably from 20 to 60% by weight, of copper(II)-chloride. The graphite-copper(II)-chloride intercalation compound itself can be formed in desired manner, for instance by heating graphite powder and anhydrous CuCl$_2$ to 400° C. in a chlorine current or effecting the heating to 350° C. if graphite powder and anhydrous CuCl is used. Particularly active catalysts are obtained if the intercalation compound is used in a form wherein the graphite powder and pulverulent

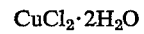

$$CuCl_2 \cdot 2H_2O$$

have been heated to about 500° C. in a current of chlorine. It is preferred to use a precompacted mixture of the pulverulent materials and to treat the mixture in the presence of a chlorine current which has been saturated with 1,2-dichloroethane at a slightly increased pressure.

The carrier component of the catalyst may either consist of aluminumoxyhydrate alone or a mixture of aluminumoxyhydrate and asbestos powder. The term "aluminum oxyhydrate" is understood herein to relate to all compounds which after roasting yield an aluminum oxide of a high specific surface. Particularly suitable are aluminumoxyhydrates of the boehmite type.

The presence of asbestos powder in the carrier material has a substantial effect on the stability of the final catalyst. Surprisingly, it has been found that highly stable active catalysts can be obtained if the asbestos powder fraction is comparatively low. It is therefore preferred to use the asbestos powder in an amount between 0.1 to 5% by weight relative to the non-calcined total mixture.

To make the staped bodies the pulverulent graphite-copper(II)-chloride intercalation compound is mixed intimately with the carrier material and is moistened with a plastizing medium in order to permit shaping of the mass. In the absence of asbestos powder water or dilute acetic acid may be used as the plasticizing medium. If asbestos powder is present, aqueous hydrochloric acid is preferred. The use of other aqueous acids such as sulfuric acid is possible, but results in less desirable products The plasticized material is subsequently shaped to the desired bodies by extrusion or on a tabletting machine. The shaped bodies are then dried, for instance at temperatures between 110 and 180° C., and are calcined at temperatures between 250 and 700° C.

The temperatures of the calcination have a substantial effect on the activity and stability of the final graphite-copper(II)-chloride intercalation compound and catalyst-carrier combination. If no asbestos powder is necessary in the carrier material, higher calcination temperatures are required in order to obtain a mechanically stable catalyst. The calcination is then preferably carried out at temperatures between 550 and 650° C.

If asbestos powder forms part of the carrier material, the calcination is preferably effected at temperatures between 300 and 400° C., since the use of higher temperatures may possibly result in a decreased activity of the final catalyst. The calcination requires in general only a few hours of treatment.

The intercalation catalyst-carrier combination of the invention can be further improved by subjecting the graphite-copper(II)-chloride intercalation compound to a thermal pretreatment at temperatures between 500 and 700° C. prior to mixing it with the carrier material. The preferred treatment for thermal activation of the intercalation compound is at a temperature between 550 and 650° C. This thermal pretreatment of the intercalation compound results in a substantial improvement both of the stability and the activity of the catalyst. The increase in stability of the catalyst due to the thermal pretreatment is obtainable both without and with the asbesos powder. For instance the thermally pretreated intercalation compounds are, even without the addition of the asbestos, of such high stability that they retain their shape practically without limit during the oxychlorination reactions. Catalysts with an addition of asbestos in the carrier material are able to withstand still harsher reaction conditions than those without asbestos. The improvement of the acivity is indicated by the fact that the reactions can be carried out at lower temperatures. Thus, the formation of by-products can be largely avoided.

The catalysts of the invention have general use in all reactions which are carried out with Deacon catalysts. Such reactions are for instance

[a] the oxychlorination of hydrocarbons and chlorinated hydrocarbons such as ethane, ethylene, vinyl chloride, etc.;

[b] the partial chlorination of chloroalkanes, such as the chlorination of 1,2-dichloroethane to form 1,1,2,2-tetrachloroethane;

[c] the production of chlorine from hydrogen chloride and oxygen;

[d] reactions in which hydrogen chloride is split off, for instance the conversion of pentachloroethane to tetrachloroethylene; and

[e] the conversion of symmetric tetrachloroethane with oxygen to perchloroethylene or the conversion of ethylchloride to vinylchloride upon elimination of water.

By suitable selection of the starting products and processess of making the materials, shaped graphite-copper-(II)-chloride intercalation carrier-catalyst combinations can be made which are of particular use for a particular purpose, that is, are distinguished in such connection by high activity and stability. Because of their high stability the shaped catalysts of the invention are excellently suited for use in a solid bed. The advantage of the catalysts is particularly that the reactions can be carried out at comparatively low temperatures. As a consequence, the amount of by-products formed in the reaction is low. It is thus possible to obtain the desired final products in a simple manner at a high degree of purity.

The following examples will further illustrate the invention.

Examples 1–6 particularly illustrate the making of the catalyst-carrier combinations, while Examples 7 and 8 illustrate the use thereof.

EXAMPLE 1

This example illustrates the making of a mechanically stable catalyst. 2.2 kg. of graphite-$CuCl_2$ intercalation compound were mixed with 4.6 kg. boehmite, 44 g. MHB3000 tylose (methyl cellulose) and 3.6 l. $H_2O$. The intercalation compound contained 40 wt. percent $CuCl_2$ and had been made by heating graphite powder and anhydrous $CuCl_2$ in a chlorine current for 8 days at a temperature of 400° C. and subsequently activating the compound for 2 hours at 600° C. Thus, a mass was obtained which could be formed by compression. The mass was pressed in a hydraulic press with a nozzle diameter of 4.8 mm. to form a strand which then was divided into equal pieces of about 4.5 mm. length each. The shaped bodies were then dried for 2 hours at 150° C. and calcined for 2 hours at 600° C.

EXAMPLE 2

This example also illustrates the making of a mechanically stable catalyst which was formed as described in Example 1, except that the intercalation compound was made by heating for 24 hours to 500° C. graphite and $CuCl_2 \cdot 2H_2O$ in a 1,2-dichloroethane saturated chlorine current, followed by activation at 600° C.

EXAMPLE 3

This example illustrates the formation of a shaped catalyst. 305 g. graphite-$CuCl_2$ intercalation compound were mixed with 40 wt. percent $CuCl_2$. The intercalation compound was formed by heating for eight days of the graphite powder and anhydrous $CuCl_2$ in a chlorine current at 400° C. The intercalation compound was then mixed with 300 g. boehmite of a specific surface of 250 m.$^2$/g. and with 5.3 g. asbestos powder. The mass was then moistened with 210 ml. of a semiconcentrated hydrochloric acid to obtain a mass which could be formed by pressing. The pressing was effected in a hydraulic press with a nozzle diameter of 4.8 mm. The thus-formed strand was then cut up into shaped bodies of about 4.5 mm. length. These bodies were dried for 2 hours at 150° C. and susbsequently calcined for two hours at 350° C.

EXAMPLE 4

A mechanically stable catalyst was made as in Example 3, except that the graphite-$CuCl_2$ intercalation compound was subjected to calcination for 2 hours at about 600° C. prior to mixing it with the other components.

EXAMPLE 5

In this case again a mechanically stable catalyst was made by mixing 305 g. of a graphite-$CuCl_2$ intercalation compound with 300 g. boehmite of a specific surface of 250 m.$^2$/g. and 5.3 g. asbestos powder. The intercalation compound contained 40% by weight $CuCl_2$ and was made by heating to 500° C. for 24 hours a mixture of graphite and $CuCl_2 \cdot 2H_2O$ in a chlorine current which was saturated with 1,2-dichloroethane. After intimately mixing the carrier and the intercalation compound, the mass was subsequently mixed with 210 ml. of a semiconcentrated hydrochloric acid. The mass thus obtained could be pressed in a hydraulic press of a nozzle diameter of 3 mm. to form a strand-shaped body. The body was then cut up in pieces of about 3 mm. length. The individual pieces were then dried for 2 hours at 150° C. and thereafter calcined for another 2 hours at 350° C.

EXAMPLE 6

A mechanically stable catalyst was formed as described in Example 5, except that the graphite-$CuCl_2$ intercalation compound was calcined for 2 hours at about 600° C. prior to mixing it with the other components.

TESTS AND USES

To determine the activity and the mechanical stability of the catalysts formed in Examples 1–6, tests were carried out with the catalysts in oxychlorination and chlorination processes. The reactions were carried out under conditions which resulted in approximately quantitative yields. As a measure of the activity of the individual catalysts, the temperature was ascertained that was necessary in each case to carry out the reaction. The stability of the catalysts was determined in long-term tests. The results are summarized in the table which follows Example 8.

The table includes a comparison test identified as Test No. 7 which was carried out with the catalyst formed in accordance with the disclosure of the above-mentioned French patent. In this case 50 wt. percent of a graphite-$CuCl_2$ intercalation compound were mixed with 50% by weight of γ-aluminum oxide to form tablets of a diameter between 2 and 5 mm. The intercalation compound had been made by heating a mixture of 60 wt. percent graphite powder and 40 wt. percent of anhydrous CuCl₂ for 8 days at 400° C. in a chlorine current.

EXAMPLE 7

Oxychlorination of ethylene

A vertical cylindrical titanium tube of a length of 150 cm. was filled with the particular catalyst. The catalyst volume was 650 ml. A gas mixture consisting of ethylene, hydrogen chloride and air was then passed across the surface of the catalyst. The amount of ethylene was about 0.5 mol/hr. Ethylene and hydrogen chloride were added in about stoichiometric relation and air was added in an excess of about 10%. The reaction temperature was selected in such a manner that the degree of conversion relative to the hydrogen chloride was at or slightly above 97%. The reaction temperatures are listed in the referred-to table, which also shows the results regarding the stability of the catalysts.

EXAMPLE 8

Making of 1,1,2,2-tetrachloroethane

A titanium tube of a length of 150 cm. was filled with the particular catalyst. The catalyst volume was 650 ml. to make the 1,1,2,2-tetrachloroethane a gas mixture was passed across the catalyst which contained 1,2-dichloroethane, hydrogen chloride and chlorine in approximately stoichiometric ratio. Per hour about one-half mole of 1,2-dichloroethane were passed across the catalyst. The temperatures then ascertained at which the chlorine had reacted about quantitatively. The reaction temperatures and the values found for the mechanical stability of the catalyst appear from the following table.

What is claimed as new and desired to be protected by Letters Patent is set forth in the appended claims:

1. The process of making a form stable catalyst-carrier combination comprising intimately mixing and plasticizing 25-66% by weight of a graphite-copper(II)-chloride intercalation compound and 75-34% by weight of aluminum-oxyhydrate having a specific surface of 50-300% m.²/g., then shaping the plasticized material, thereafter drying the shaped body and calcining it at temperatures between 250 and 700° C.

2. The process of claim 1, wherein water is used as the plasticizing medium for the mass.

3. The process of claim 1, wherein the calcination is carried out at 550-650° C.

4. The process of claim 1, wherein asbestos is added as a component of the carrier in an amount up to 15% by weight relative to the non-calcined total mixture.

5. The process of claim 4, wherein the amount of asbestos used in the carrier is between 0.1 and 5% by weight relative to the total non-calcined mass.

6. The process of claim 4, wherein aqueous hydrochloric acid is used to plasticize the mass.

7. The process of claim 4, wherein the calcination is carried out at a temperature between 300 and 400° C.

8. The process of claim 1, wherein the graphite-copper-(II)-chloride intercalation compound contains 10-69.6% by weight of copper(II)-chloride.

9. The process of claim 1, wherein the graphite-copper(II)-chloride intercalation compound contains 20-60% by weight of copper(II)-chloride.

10. The process of claim 1, wherein a graphite-copper-(II)-chloride intercalation compound is employed which has been made from graphite powder and pulverulent CuCl₂·2H₂O.

11. The process of claim 1, wherein the graphite-copper(II)-chloride intercalation compound is subjected to an activation at temperatures between 500 and 700° C. prior to mixing it with the carrier material.

12. A form stable catalyst-carrier combination prepared by plastifying and shaping a mixture of 25 to 66% by weight of a copper(II)-chloride-graphite intercalation compound and 75 to 34% by weight of an aluminumoxyhydrate of a specific surface of 50 to 300 m.²/g. and 0–15% by weight of asbestos relative to the non-calcined total mixture and calcining the shaped bodies after drying the same.

TABLE

| | Catalyst | | | Oxychlorination reaction | | Chlorination reaction | |
|---|---|---|---|---|---|---|---|
| | Asbestos addition, | Intercalation compound | | | | | |
| Test No. | weight percent | Made of— | Activated at, °C. | Reaction temperature, °C. | Mechanical stability | Reaction temperature, °C. | Mechanical stability |
| 1 | 0.0 | CuCl₂ | | 210 | After 3,000 h. still unchanged | 210 | Slow disintegration after about 80 hrs. |
| 2 | 0.0 | CuCl₂ aq | 600 | 210 | do | 210 | Do. |
| 3 | 0.87 | CuCl₂ | | 220 | do | 230 | After 300 hours still unchanged. |
| 4 | 0.87 | CuCl₂ aq | 600 | 215 | do | 220 | Do. |
| 5 | 0.87 | CuCl₂ | | 215 | do | 220 | Do. |
| 6 | 0.87 | CuCl₂ aq | 600 | 210 | do | 210 | Do. |
| 7 | | Comparison | | 240–260 | Disintegration in a few hours | >260 | Disintegration in a few hours. |

References Cited

UNITED STATES PATENTS

| 3,375,201 | 3/1968 | Winyall | 252—451 X |
| 2,919,266 | 12/1959 | Lauer | 252—441 X |
| 3,184,515 | 5/1965 | Panne et al. | 260—659 A |
| 3,240,827 | 3/1966 | Lainé et al. | 252—441 X |
| 3,461,084 | 8/1969 | Li | 252—441 |

FOREIGN PATENTS

| 1,533,567 | 6/1968 | France | 252—441 |
| 1,223,350 | 8/1966 | Germany | 252—441 |

PATRICK P. GARVIN, Primary Examiner

U.S. Cl. X.R.

260—658 R, 659 A